United States Patent
Anazawa et al.

(10) Patent No.: US 7,458,254 B2
(45) Date of Patent: Dec. 2, 2008

(54) APPARATUS FOR EVALUATING PIEZOELECTRIC FILM, AND METHOD FOR EVALUATING PIEZOELECTRIC FILM

(75) Inventors: Toshihisa Anazawa, Kawasaki (JP); Mineharu Tsukada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 11/512,328

(22) Filed: Aug. 30, 2006

(65) Prior Publication Data
US 2007/0227235 A1  Oct. 4, 2007

(30) Foreign Application Priority Data
Mar. 30, 2006  (JP) ............... 2006-095588

(51) Int. Cl.
  G01B 21/30  (2006.01)
  G01L 25/00  (2006.01)
(52) U.S. Cl. .............. 73/105; 73/1.15; 73/DIG. 4
(58) Field of Classification Search ............ 73/105, 73/1.15, 150 R, 866, DIG. 4
  See application file for complete search history.

(56) References Cited

U.S. PATENT DOCUMENTS 4,668,909 A * 5/1987 Hickernell et al. .... 73/DIG. 4 X
5,319,977 A * 6/1994 Quate et al. ................ 73/606
5,581,021 A * 12/1996 Flechsig et al. ............. 73/105
6,072,764 A   6/2000 Shido et al. ................ 369/126
6,953,519 B2 * 10/2005 Shirakawabe et al. .. 204/192.32
2003/0234358 A1 * 12/2003 Higgins et al. ......... 73/105 X

FOREIGN PATENT DOCUMENTS

JP    6-258072    9/1994
JP    10-312592   11/1998

OTHER PUBLICATIONS

A.L. Kholkin et al.; Interferometric measurements of electric field-induced displacements in piezoelectric thin films,: Rev. Sci. Instrum. 67 (5), May 1996, American Institute of Physics, 1935-1941.

* cited by examiner

Primary Examiner—Thomas P Noland
(74) Attorney, Agent, or Firm—Kratz, Quintos & Hanson, LLP

(57) ABSTRACT

There are provided an apparatus for evaluating a piezoelectric film, which contains: a detection unit containing a pair of probes, each probe containing a cantilever and a probe tip; and an evaluation unit, wherein the detection unit is configured to respectively place the probe tips on both surfaces of a sample comprising a piezoelectric film so as to detect a displacement magnitude of the pair of probes, and the evaluation unit is configured to evaluate either or both a deformation and a displacement of the piezoelectric film based upon the detected displacement magnitude of the pair of probes, and a method for evaluating a piezoelectric film by using the apparatus for evaluating a piezoelectric film.

20 Claims, 11 Drawing Sheets

Rev.Sci. Instrum, 67, 1935 (1996)

(a)

(b)

20

(c)

25
20

(a)

(b)

(c)

APPARATUS FOR EVALUATING PIEZOELECTRIC FILM, AND METHOD FOR EVALUATING PIEZOELECTRIC FILM

CROSS-REFERENCE TO RELATED APPLICATIONS

This application is based upon and claims the benefits of the priority from the prior Japanese Patent Application No. 2006-095588 filed on Mar. 30, 2006, the entire contents of which are incorporated herein by reference.

BACKGROUND OF THE INVENTION

1. Field of the Invention

The present invention relates to an apparatus and method for evaluating a piezoelectric film, which evaluate either deformation or displacement of a piezoelectric film with a simple manner, efficiency, and high accuracy.

2. Description of the Related Art

To evaluate a slight deformation of a sample, such as evaluating the piezoelectricity thereof, laser displacement meters utilizing an interference of light, atomic force microscopes (AFM) and the like have conventionally been utilized. As shown in FIG. 1, butterfly curves are utilized to evaluate piezoelectricity of a piezoelectric film, and such the butterfly curves plot deformations of the piezoelectric film relative to the applied voltage thereto.

Specifically, in the case where the AFM is utilized for evaluating the piezoelectricity, a tip 7 of a probe 6 is placed onto a surface of a sample 5, which has a substrate 1, a lower electrode 2, a piezoelectric film 3, and an upper electrode 4 formed in this order on the substrate, as shown in FIG. 2A. Sequentially, the voltage is applied to the lower electrode 2 and the upper electrode 4. The deformation of the sample 5 at the time when the voltage is applied is measured as well as the displacement magnitude of the probe 6, and the results are plotted in a graph so as to obtain a butterfly curve as shown in FIG. 1.

At the time of detecting the deformation of the sample in such a devise using the AFM, there has been proposed a method wherein a laser beam is emitted from a light source to the probe whose tip is placed on the surface of the sample, and the reflected beam from the probe is detected by means of a detector to thereby determine the displacement magnitude of the probe and the piezoelectricity of the sample is evaluated based upon the determined displacement magnitude (refer to, for example, Japanese Patent Application Laid-Open (JP-A) No. 06-258072).

In an evaluation device using the aforementioned laser displacement meter, a displacement magnitude can be measured, for example, by irradiating a laser beam from a light source 8 to a surface of the sample 5 that is formed in the aforementioned manner, and detecting the reflected light from the sample 5, as shown in FIG. 2B.

There has also been proposed a more simple device wherein a displacement magnitude of a probe is measured by using a piezoelectric resistor, instead of a laser beam (refer to JP-A 10-312592).

FIG. 3 is a schematic diagram of the aforementioned device for evaluating a piezoelectric film, which illustrates the deformation and displacement of the piezoelectric film 3 at the time of evaluating the piezoelectricity thereof, before and after an application of a voltage thereto. The sample 5 as shown in FIG. 3(1) is shrank (or stretched) in the thickness direction, and is stretched (or shrank) in the horizontal direction as a result of the voltage application, as shown in FIG. 3(2). In this way, the sample 5 is deformed. By plotting the thickness of the piezoelectric film as shown with an arrow "a" in FIG. 3, it is expected to form a curve which shows the actual deformation and displacement of the piezoelectric film, as shown with "a" in FIG. 4.

However, as shown in FIG. 3(3), the piezoelectric film 3 is, in fact, stretched (or shrank) in the inner direction by the voltage at the time of being shrank (or stretched) in the thickness direction. Therefore, a stress is caused between the piezoelectric film 3 and the substrate 1, and the whole area of the substrate and the sample are warped as shown in FIG. 3(3). For this reason, in the film sample 5 formed on the substrate 1, the deformation of the piezoelectric film 3 itself is added with the displacement due to the warp of the sample 5 (the displacement shown with the arrow b in FIG. 3(3)), and the plots of the measured deformation and displacement shows the curve as shown with c in FIG. 4. Therefore, the actual deformation magnitude of the sample 5 itself cannot be accurately evaluated.

In order to solve these problems caused by a warp of a sample, there has been applied a method wherein a surface perpendicular axis on both surfaces of a sample is measured by a laser displacement meter, and a displacement magnitude of the sample is measured based upon the difference in the measurements. This method is called a double-beam system. In the double-beam system, the reflected light from a surface of the sample is lead to emit the other surface of the sample, and make reflected by the other surface. The light pass differences between the surface and the other surface of the sample caused as a result of the displacement of the sample are canceled, and thus only a thickness of the sample can be measured (refer to Rev. Sci. Instrum, 67. 1935 (1996), and FIG. 5).

However, there has been a problem in this method such that the control of the measuring positions is difficult. Specifically, in the laser displacement meter, it is necessary to irradiate a laser beam perpendicularly to a surface to be measured. At the time of aligning the laser beam, the incident angle to the sample changes if the area to be irradiated changes. It is therefore necessary to control the laser beam so as to irradiate to the certain area with the certain incident angle, but this control is extremely complicated. Especially, the control of the laser beam having a complicated and long optical path, e.g., a laser beam in the double-beam system, requires sophisticated technology. This may be overcome in accordance with a method which is capable of controlling the irradiating area and incident angle at once by preparing a special optic system. However, in this case, it is more time-consuming and troublesome to repair the system once the system becomes out of the order due to any change in the age.

In the simple laser displacement meter, either the single-beam system or the double-beam system, there were problems such that the maximum surface resolution starts decreasing at micrometer-order due to diffraction limit of the laser beam, compared to AFM, as shown in the following table 1; it is necessary to increase a numerical aperture of the condensing lens to improve the surface resolution, namely to shorten a focal length; and it is difficult to handle since the focal length is short.

Moreover, in the double-beam system, there are problems such that, together with the aforementioned problems of the surface resolution of micrometer-order, it is difficult to scan a laser beam to a sample; and it is not able to evaluate a three-dimensional structural deformation by measuring the displacement magnitude of the sample having a small structure of micrometer-order at various position by scanning a laser beam such as by means of a micro machine of Micro Electro Mechanical System, MEMS.

TABLE 1

|  | Laser displacement meter | AFM |
| --- | --- | --- |
| Vertical resolution (normal/max) | 40 pm/1 pm | 10 pm/1 pm or less |
| Max. surface resolution | micrometer | approximately 20 pm or less |
| Surface scan (3-dimensional measurement) | Difficult | Easy |
| Control | Complicated (position, angle) | Easy |

Accordingly, it has been desired, but not realized, to provide an apparatus and method for evaluating a piezoelectric film, which evaluate deformation and/or displacement of an dielectric film with a simple manner, efficiency, and high accuracy, without complex controls such as controls of positions and angles.

The present invention is therefore aimed at solving the aforementioned problems in the related art, and achieving the following object.

An object of the present invention is to provide an apparatus and method for evaluating a piezoelectric film, which evaluate a deformation and/or displacement of an dielectric film with a simple manner, efficiency, and high accuracy.

As a result of the diligent studies conducted by the present inventors to achieve the aforementioned object, the present inventors has found the following insights. Namely, it is an insight that, by measuring displacements of a piezoelectric film from both surfaces thereof by using two probes, the displacement magnitude of the piezoelectric film itself can be highly accurately evaluated based upon the deference in the measured displacements.

It is another insight that, by using the probes, the handling becomes easy, and an evaluation of the piezoelectric film can be easily and efficiently performed since a control of an incident angle which is required in a laser displacement meter is not necessary.

It is yet another insight that AFM of even a simple mechanism easily attains a high vertical resolution and surface resolution of nanometer-order compared with a laser displacement meter, as shown in Table 1, it is thus possible to locally measure the displacement, and it is also possible to measure the displacement of the sample three-dimensionally by scanning the measuring points within the surfaces of the sample.

SUMMARY OF THE INVENTION

The apparatus for evaluating a piezoelectric film of the present invention contains at least a pair of the probes wherein each probe contains a cantilever and a probe tip, and contains at least a detection unit which is configured to respectively place the probe tips on both surfaces of a sample containing a piezoelectric film so as to detect a displacement magnitude of the pair of the probes, and an evaluation unit which is configured to evaluate a deformation and/or displacement of the piezoelectric film based upon the displacement magnitude of the pair of the probes.

In the apparatus for evaluating a piezoelectric film, the detection unit detects the displacement magnitude of the pair of the probes by placing the probe tips of the probes respectively on the both surfaces of the sample. The detection unit does not require any complex controls such as a control of an incident angle, and the displacement magnitude of the probes can be easily, efficiently, and highly accurately determined. The evaluation unit evaluates the deformation and/or displacement of the piezoelectric film based on the displacement magnitude of the pair of the probes detected by the detection unit. Therefore, the evaluation unit highly accurately evaluates the deformation and/or displacement of the piezoelectric film itself by deducting an error occurred by a warp of the piezoelectric film.

The method for evaluating a piezoelectric film of the present invention is performed by means of the apparatus for evaluating a piezoelectric film of the present invention. The method of the present invention contains at least to place a pair of probe tips which are respectively contained in a pair of the probes on both surfaces of a sample containing a piezoelectric film so as to detect a displacement magnitude of the pair of the probes (referred as a detection step or a step of detecting hereinafter), and to evaluate a deformation and/or displacement of the piezoelectric film based upon the displacement magnitude of the pair of the probes detected in the step of detecting (referred as an evaluation step or a step of evaluating hereinafter).

In the method for evaluating a piezoelectric film, the step of detecting is to detect the displacement magnitude of the probes by placing the probe tips of the probes respectively on the both surfaces of the sample. The step of detecting does not require any complex controls such as a control of an incident angle, and the displacement magnitude of the probes can be easily, efficiently, and highly accurately determined. The step of evaluating is to evaluate the deformation and/or displacement of the piezoelectric film based on the displacement magnitude of the pair of the probes detected in the step of detecting. Therefore, in the step of evaluating, a highly accurately evaluation is possible on the deformation and/or displacement of the piezoelectric film itself by deducting an error occurred due to a warp of the piezoelectric film.

Figure 1:
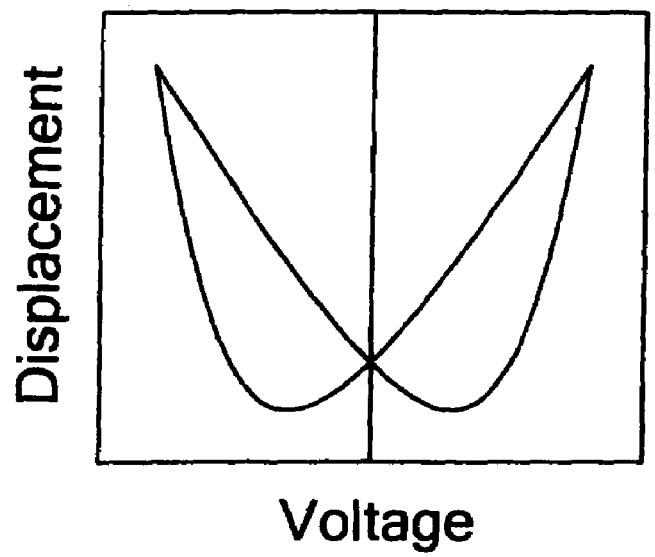
FIG. 1 is a graph showing an example of a butterfly curve for evaluating a piezoelectricity of an piezoelectric film.
Figure 2A:
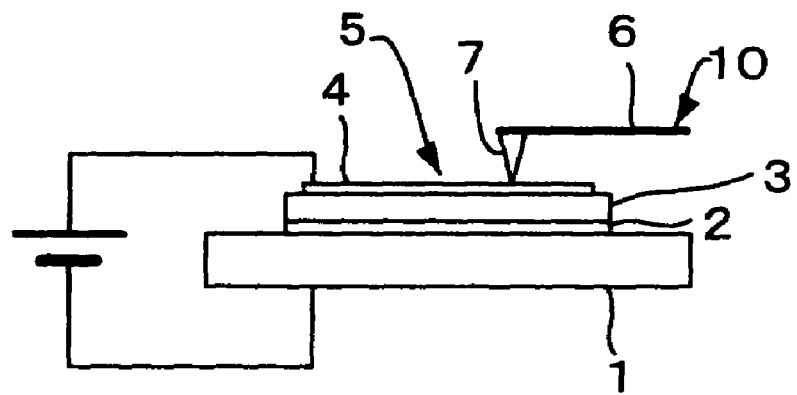
FIG. 2A is a schematic diagram showing a device for evaluating a piezoelectric film using the conventional AFM.
Figure 2B:
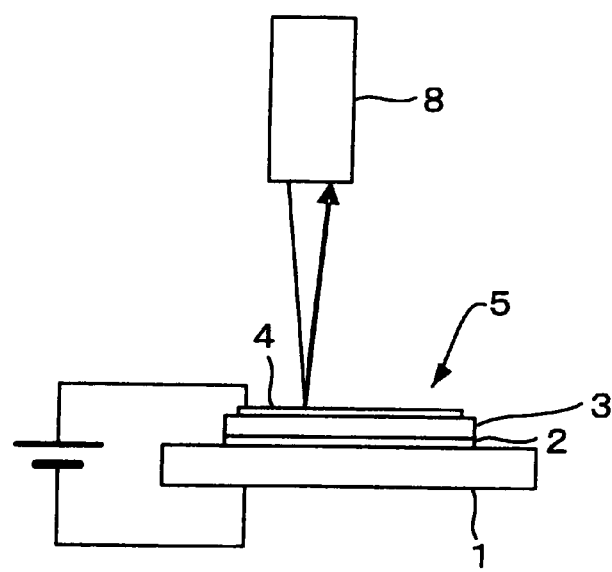
FIG. 2B is a schematic diagram showing a device for evaluating a piezoelectric film using the conventional laser displacement meter.
Figure 3:
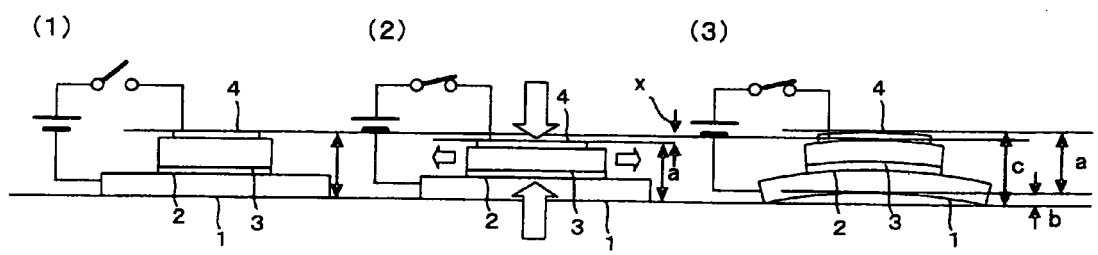
FIG. 3 is a schematic diagram showing displacements of an piezoelectric film before and after applying a voltage by means of the conventional AFM.
Figure 4:
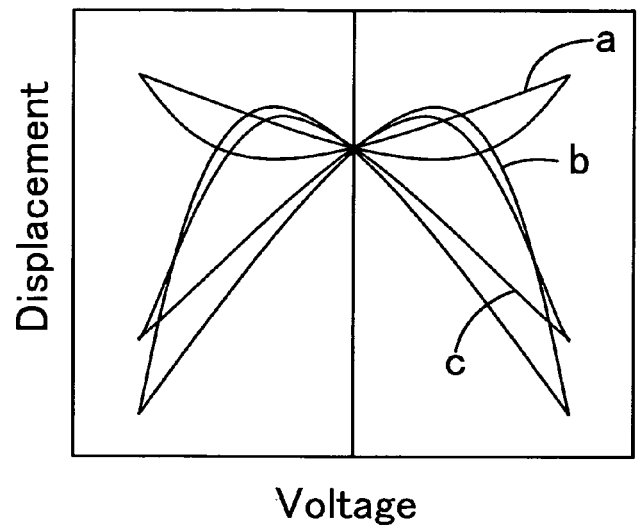
FIG. 4 is a graph of piezoelectricity which is obtained by plotting the measurements taken from the device shown in FIG. 3.
Figure 5:
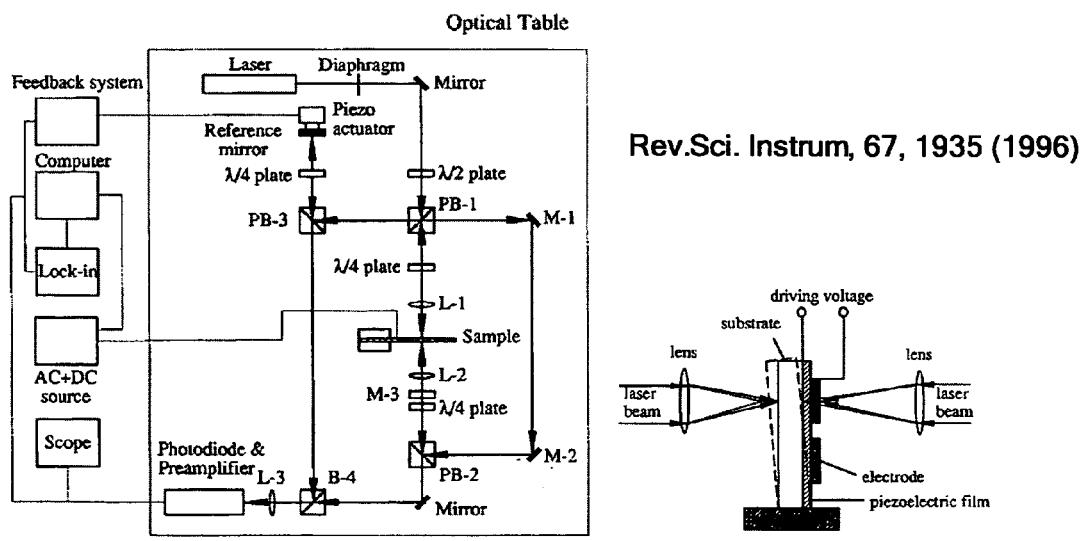
FIG. 5 is a schematic diagram showing a device for evaluating a piezoelectric film in the conventional double-beam system.

DESCRIPTION OF THE PREFERRED EMBODIMENTS (Apparatus and Method for Evaluating Piezoelectric Film)

The apparatus for evaluating a piezoelectric film of the present invention contains at least a detection unit and an evaluation unit, and further contains other units or means, if necessary.

The method for evaluating a piezoelectric film of the present invention contains at least a step of detecting, and a step of evaluating, and further contains other steps, if necessary.

The step of detecting is performed by means of the detection unit, and the step of evaluating is performed by means of the evaluation unit.

In the present specification, "place the probe tip on the surface of the sample" means, not only to allow the probe tip to contact with the surface of the sample, but also to interact with the surface of the sample with physical force caused between the atoms of the probe tip and the atoms of the surface of the sample, for example by vibrating the probe tip, without allowing the probe tip to directly contact with the surface of the sample.

In the present specification, the terms "deformation and displacement" denotes: a partial structure of the piezoelectric film in a certain area or at certain positions, such as thickness or shape thereof; a structural change of a certain area of the piezoelectric film such as sequential change in thickness or shape thereof due to shrinkage or stretch thereof before or after an application of a voltage; a structural change such as a change in thickness or shape due to a change of a measuring position at the time of scanning the measuring position throughout the surface of the film; a structural change such as a change in thickness before and after applying the voltage at the time of scanning the measuring position throughout the surface of the film; a wrap of the piezoelectric film due to the application of the voltage; and the like.

The evaluation of the deformation and/or displacement of the piezoelectric film is, for example, to evaluate a thickness of a certain area or position of the piezoelectric film based upon the displacement magnitude of the probes from the initial positions, or to evaluate a deformation, e.g., shrinkage, stretch, and warp, of a certain are or position of the piezoelectric film, or a displacement, e.g., a change in the thickness, and a change in the shape of the surface due to the aforementioned deformation, of a certain area or position of the piezoelectric film based upon the displacement magnitude of the probes before and after an application of a voltage.

In addition to above, the evaluation can also be performed by scanning a pair of the probes on the surface of the piezoelectric film (sample) along X axis and/or Y axis directions which are parallel to the surface of the piezoelectric film, to thereby evaluate the structure of the piezoelectric film two-dimensionally or three-dimensionally. Moreover, the evaluation can be performed by scanning a pair of the probes on the surface of the piezoelectric film in the same manner, and evaluating the deformation and/or displacement of the piezoelectric film two-dimensionally or three-dimensionally before and after an application of a voltage.

—Detection Unit and Detection Step—

The detection unit contains at least a pair of probes, and each probe contains a cantilever and a probe tip. The detection unit optionally contains a unit for measuring a force of the pair of the probes, a unit for measuring positions of the pair of the probes, a transferring unit for the probes or a piezoelectric film, and the like.

The step of detecting is, by means of the detection unit, to place the pair of the probes respectively to both surfaces of a sample at the predetermined position, and to detect a displacement magnitude of the pair of the probes. The step optionally contains to measure the force of the pair of the probes, to measure the positions of the pair of the probes, to transfer the pair of the probes or the piezoelectric film, and the like.

The sample contains at least a substrate, and a piezoelectric film formed on the substrate. In this case, one of the probe tips is placed on a surface of the piezoelectric film, the other probe tip is placed on a surface of the sample which is opposite to the surface where the piezoelectric film is formed, and the displacement magnitude of the pair of the probes is detected via the substrate. Since the displacement magnitude is detected from the both surfaces of the sample in the present invention, errors due to the warp of the substrate can be prevented, and the displacement magnitude of the piezoelectric film itself can be determined.

The detecting method of the displacement magnitude of the probes is not particularly limited, and can be appropriately selected depending on the intended purpose. It is however preferable that the detection is carried out by detecting a change of interactions between the probe tips and the surfaces of the sample. For example, it is preferable to detect a displacement based upon a change, which is at least one selected from: a change in positions of the pair of the probes relative to the Z direction, deflections of the cantilevers, amplitudes of the vibrated cantilevers, phases of the vibrated cantilevers, and frequencies of the vibrated cantilevers.

In the case where the displacement magnitude is detected based upon the change which is selected from deflections of the cantilevers, amplitudes of the vibrated cantilevers, phases of the vibrated cantilevers, and frequencies of the vibrated cantilevers, it can be performed by the same manner as to a tapping mode, non-contact mode or the like of AFM. Note that the tapping mode is also called a intermittent (cyclic) contact mode, a dynamic force microscope, or the like.

The aforementioned detection of the Z direction position of the probes is carried out, for example, by controlling and transferring the pair of the probes or the sample in the Z direction which is perpendicular to the surface of the piezoelectric film so as to maintain a deflection of the cantilevers, amplitudes of the vibrated cantilevers, phases of the vibrated cantilevers and frequencies of the vibrated cantilevers at the certain degree at the time of placing the probe tips onto the surfaces of the sample, and detecting the position or height of the probes or the sample relative to the Z-direction. This method for the detection is more precisely explained later.

The probes or the piezoelectric film is optionally controlled to move both in the X direction and the Y direction. In this case, a pair of the probe tips are respectively placed on the surfaces of piezoelectric film at the position where the X-Y directions of a pair of the probes are matched. In this way, the positioning of the pair of the probe tips is accurately carried out on the both surfaces of the piezoelectric film. Moreover, the advantage thereof is also such that the measuring point is not limited to one position, and the detection at the predetermined position or several positions of the piezoelectric film becomes possible.

When at least one of the probes or the piezoelectric film is transferable in either of or both the X-Y directions, the piezoelectric film can be two-dimensionally (cross-sectionally) evaluated by scanning the probes along the surface of the piezoelectric film in at least one of the aforementioned directions.

When at least one of the probes or the piezoelectric film is transferable in the both X-Y directions, the piezoelectric film can be three-dimensionally evaluated by scanning the probes along the surface of the piezoelectric film in the both X-Y directions. In this case, the probes and/or the piezoelectric film can be controlled to transfer in the both X-Y directions. Moreover, it can also be controlled such that the probes are transferable in the X-direction, and the piezoelectric film is transferable in the Y-direction, or such that the probes are transferable in the Y-direction, and the piezoelectric film is transferable in the X-direction.

For one scanning, the pair of the probes or the piezoelectric film is scanned in the one direction, the X-direction or the Y-direction, to thereby evaluate the piezoelectric film parallel to X direction or Y-direction. Alternatively, the pair of the probes or the piezoelectric film is scanned in the both the X-Y directions, at the same time, for one scanning, to thereby evaluate the piezoelectric film in the predetermined direction.

The measuring device for the displacement magnitude of the probes is not particularly limited, and can be selected from the conventional devices depending on the intended purpose. Examples thereof include a device which irradiates a laser beam to the probe, determines the reflected light therefrom, and calculates the displacement magnitude of the positions of the probes based thereon, a device which uses a piezoelectric resistor, and calculates the displacement magnitude of the probes based upon the displacement of the piezoelectric resistance.

The measuring procedure for the positions of the probes is not particularly limited, and can be appropriately selected from the conventional means depending on the intended purpose. For example, the followings are preferable:
(1) Controlling the height of the probes from the surfaces of the sample by means of a piezo-actuator so as to maintain deflections of the cantilevers, amplitudes of the vibrated cantilevers, phases of the vibrated cantilevers and frequencies of the vibrated cantilevers at a certain degree, and determining the change in the heights of the probes (namely, displacements of the positions in the Z-direction) based upon the voltage applied to the piezo-actuator.
(2) Controlling the height of the probes from the surfaces of the sample in the same manner as in the above (1), disposing a mirror onto each of the probes, and measuring the displacements of the mirrors which move along with the movements of the probes by means of a laser displacement meter or the like. In this case, it is relatively easy to measure the displacements of the probes by means of the laser displacement meter since the measuring subjects are the mirrors which are flat, maintain a certain size for measuring areas of the laser displacement meter, and keep the certain distance from the laser displacement meter. Moreover, this solves the problem such that the surface resolution becomes low.
(3) Detecting gradients of the cantilevers by means of an optical lever or piezoelectric film, and calculating the displacements of the probe tips from the gradients of the cantilevers.

In the case where the probes are transferable in the X-direction, the Y-direction, or the Z-direction, a transferring unit is not particularly limited, and can be appropriately selected depending on the intended purpose. For example, the followings are preferable:
(1) Utilizing a stretch of a piezoelectric ceramic, or utilizing such the stretch which is physically enlarged.
(2) Utilizing a combination of a stepping motor, and a worm gear or pinion rack.
(3) Utilizing a combination of an impact drive of a piezoelectric element (piezoelectric ceramic) and a range-finding mechanism (a laser displacement meter, an electrostatic capacitance displacement meter, etc.).

Among them, the aforementioned (1) and (3) are preferable since precise movements can be easily controlled.

In the case where the piezoelectric film is transferable in the X-direction, the Y-direction, or the Z-direction, a transferring unit is not particularly limited, and can be appropriately selected depending on the intended purpose. Examples thereof include the aforementioned (1)-(3). Among them, the aforementioned (1) and (2) are preferable.

The probes are not particularly limited, and can be appropriately selected depending on the intended purpose. The probes are, for example, ones which are generally used in AFM.

The aforementioned detection unit is optionally configured to perform an initial setting for matching the X-Y coordinates of the pair of the probes, and/or an initial setting for matching the Z coordinates of the pair of the probes. The aforementioned step of detecting optionally contains the initial settings above.

The initial setting of the probes is performed, for example, by placing the pair of the probe tips onto both surfaces of a reference sample for positioning, which is prepared separately from a sample to be measured. The reference sample is, for example, a substrate having a reference marker, wherein the pair of the probe tips are placed onto the both surfaces of the reference marker. After performing the initial setting, the reference sample is replaced with a sample to be measured, and a measurement is then carried out. As a result, the highly accurate and easy evaluation can be possible.

The reference marker can be disposed in/on a surface of a sample to be measured. In this case, a process of replacing the reference sample with a sample to be measure can be eliminated.

By placing the pair of the probe tips onto the reference marker disposed in/on the reference sample or sample to be measured, the X-Y coordinates of the pair of the probes can be matched. This positions can be determined as an initial position of the X-Y coordinates, namely a starting point.

At the time when the pair of the probe tips are placed onto the reference sample, the positions of the pair of the probes with respect to the Z-direction is controlled so as to maintain deflections of the cantilevers, amplitudes of the vibrated cantilevers, phases of the vibrated cantilevers and frequencies of the vibrated cantilevers at a certain degree. These positions with respect to the Z-direction can be determined as initial positions, namely a starting points, for the Z coordinate.

Figure 7A:
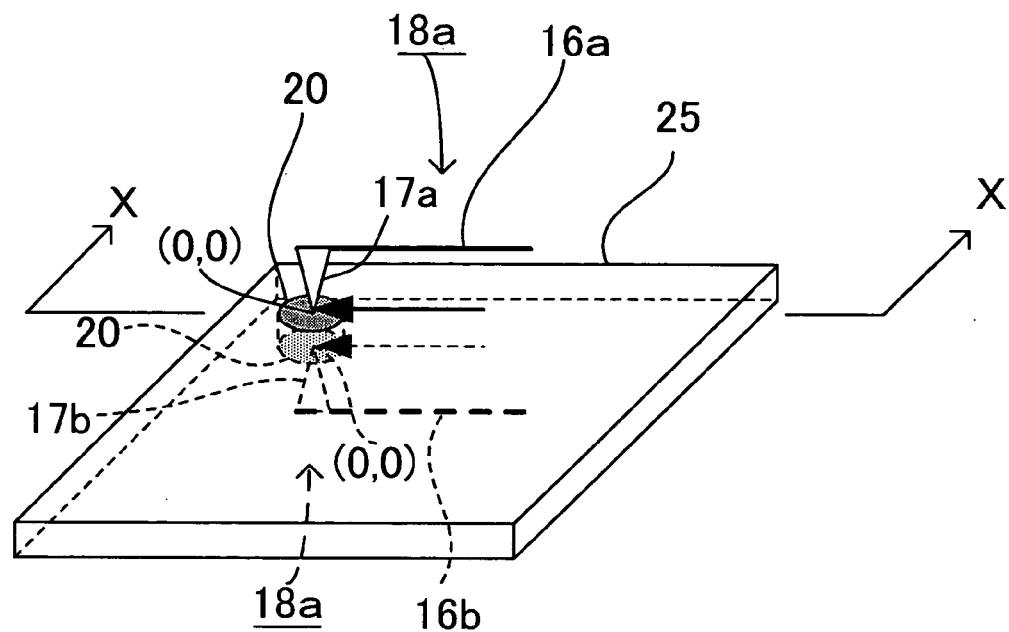
FIG. 7A is a schematic diagram showing an initial setting of the probes using a reference sample in Example 2 of the present invention.
Figure 7B:
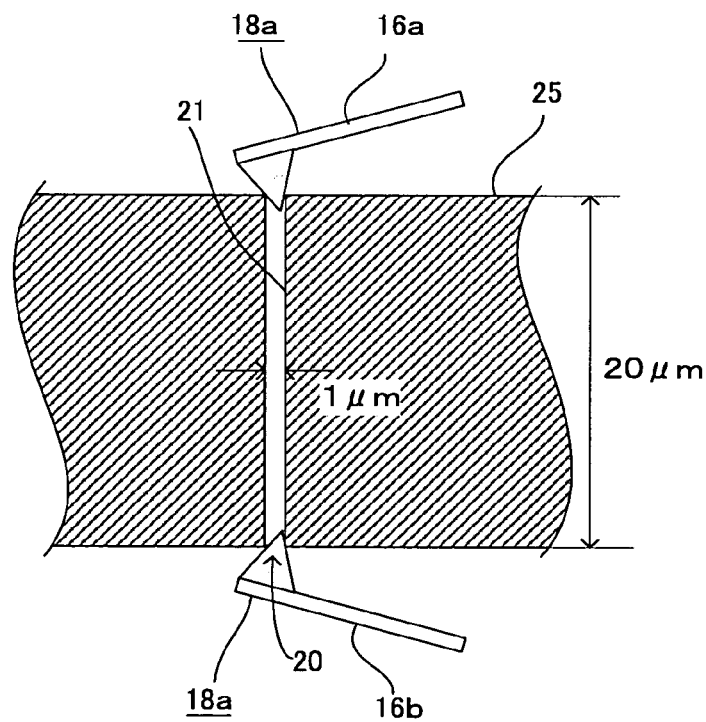
FIG. 7B is an enlarged cross-sectional view of the X-X section in FIG. 7A.

The reference marker for positioning is not particularly limited, and can be appropriately selected depending on the intended purpose. It can be selected from the commercially available products. Examples thereof include a reference marker 20, which is a hole 21 that goes through a substrate of a reference sample 25, as shown in FIGS. 7A and 7B. With this reference sample, the positioning of a pair of probes 18a, 18b can be easily carried out by placing a pair of probe tips 17a, 17b inside of the hole from the both sides of the reference sample 25. After the initial setting is carried out, the pair of the probes 18a, 18b are moved in the Z-direction so as to remove them from the surfaces of the reference sample 25, and the reference sample 25 is replaced with a sample to be measure 15. Thereafter, the pair of the probes 18a, 18b are again moved in the Z-direction so as to place the pair of the probe tips 17a, 17b onto the both surfaces of the sample 15. In this way, the displacement magnitude at the predetermined position is determined.

Moreover, the reference marker is formed, for example, by filing the hole that goes through the substrate of the reference sample with an arbitrarily selected material. Such the material is not particularly limited, and can be appropriately selected depending on the intended purpose. It is preferably a conductive material. An example of a specific method for forming the reference marker using the conductive material is such that a substrate formed of a thin metal plate or the like is irradiated with a laser beam to thereby perforate the substrate, the substrate is subjected to plating or the like so as to fill the hole, and then the substrate is polished. A silicon substrate can be also used as the substrate. In this case, the silicon substrate is perforated by an anisotropy etching, the hole is filled by a spattering method, a plasma CVD method, or the like, and then the substrate is polished.

Figure 7C:
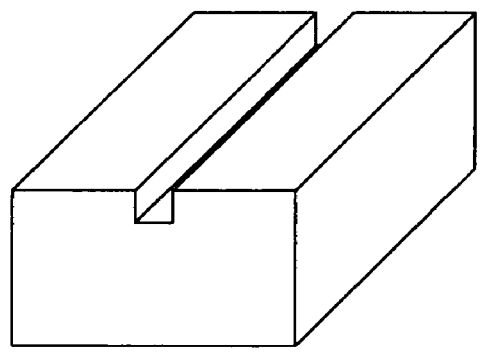
FIG. 7C is a schematic diagram showing an example of the forming process of the reference sample.
Figure 7C:
Figure 7C:
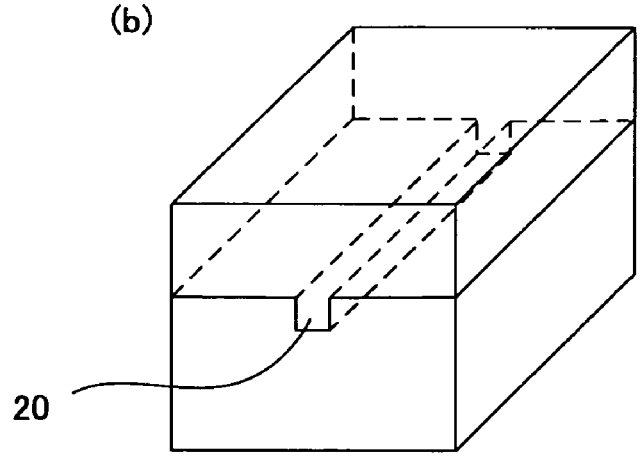
Figure 7C:
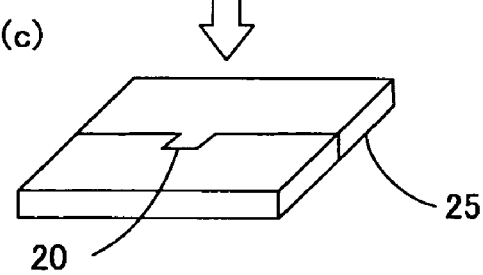

Another method for forming the reference marker is such that, in accordance with a FIB method, (a) a groove is formed on a substrate so that a depth and width thereof become approximately 100 nm, (b) the substrate is combined with another material, and (c) the combined material is sliced to form a reference sample 25, as shown in FIG. 7C.

Figure 7D:
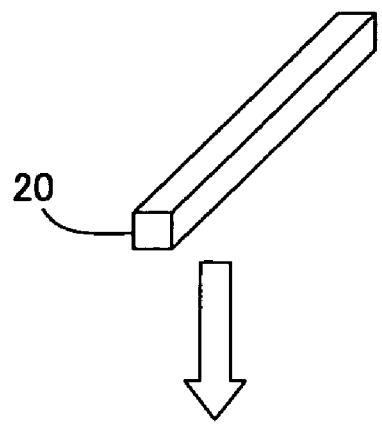
FIG. 7D is a schematic diagram showing another example of the forming process of the reference sample.
Figure 7D:
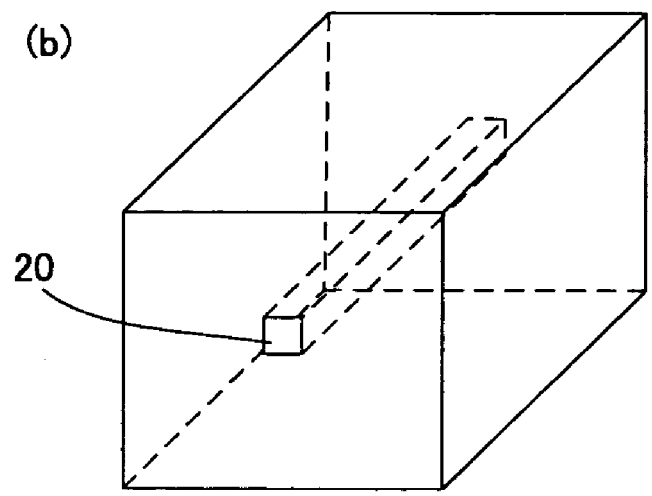
Figure 7D:
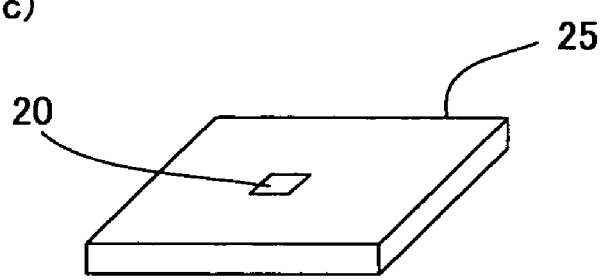

Another method for forming the reference marker is such that (a) a reference marker-forming material 20 is cut out from a silicon substrate into a rod-shape having a diameter of a few hundred nanometers in accordance with the FIB method, (b) the reference marker-forming material 20 is surrounded by another material (substrate material), and (c) the combined material is sliced to form a reference sample 25 in the same manner as described above, as shown in FIG. 7D.

A shape of the reference marker is not particularly limited, and can be appropriately selected depending on the intended purpose. The reference marker can be in any shape, for example, circle, ellipse, polygon such as triangle or square, star shape, and the like. A size of the reference marker is preferably in the range of 50 nm to 10 μm. When the size of the reference marker is within the aforementioned range, the probe tips are efficiently placed on the reference marker. The size of the reference marker is more preferably in the range of 100 nm to 1 μm.

A number of the reference marker is not particularly limited, and can be appropriately selected depending on the intended purpose. The number thereof can be one, or two or more.

In the case where two or more reference markers are formed in/on the reference sample or sample to be measured, when the X-Y axes of one probe is not parallel to the X-Y axes of the other probe, or when there is an error in transferring amount towards the X-Y directions due to the deference in the transferring unit, the deference of the axes or the error in the transferring amount can be evaluated by measuring the positions with the two or more reference markers. By appropriately making a correction based upon such the measurements, the accuracy of the positioning of the pair of the probes is increased, and it becomes possible to perform a measurement at the same positions on the both surfaces of the piezoelectric film.

Other than using the aforementioned reference sample, the initial setting can be performed by means of SEM wherein the pair of the probes are integrated. Moreover, the displacement of the pair of the probes can also be detected by means of the SEM.

—Evaluation Unit and Evaluation Step—

The evaluation unit is configured to evaluate a deformation and/or displacement of the piezoelectric film based upon the displacement magnitude of the pair of the probes detected by the detection unit. The evaluation unit contains at least a calculator, and optionally contains a display which displays the evaluated results.

The step of evaluating is to evaluate a deformation and/or displacement of the piezoelectric film based upon the displacement magnitude of the pair of the probes detected in the step of detecting. The step of evaluating contains at least calculating, and optionally contains displaying the evaluated results on a monitor or the like.

The calculator calculates a displacement based upon a change which is selected from a change in deflections of the cantilevers, a change in an amplitude of the vibrated cantilevers, a change in a phase of the vibrated cantilevers, and a change in a frequency of the vibrated cantilevers.

By calculating a deference between the displacement of one probe and the displacement of the other probe, the thickness of the piezoelectric film itself can be determined at the measuring point, and the relative positions on the both surfaces of the piezoelectric film can be determined by the displacements of the positions of the pair of the probes.

In the case where the evaluation of the piezoelectric film is performed before and after applying the voltage, the structural change such as thickness or shape, of the piezoelectric film due to the change of the voltage can be determined before and after applying the voltage, and thus the deformation thereof such as shrinkage, stretch, warp, and the like can be evaluated.

In the case where the piezoelectric film is evaluated two-dimensionally or three-dimensionally, a cross-sectional structure or three-dimensional structure at an arbitral part of the piezoelectric film can be determined by plotting the thickness and position on the surface of the piezoelectric film obtained by scanning the probes relatively along the piezoelectric film.

In the case where the piezoelectric film is evaluated two-dimensionally or three-dimensionally before and after applying the voltage, as mentioned above, the deformation and/or displacement of the cross-sectional structure or three-dimensional structure can be determined before and after applying the voltage by comparing the structures of before and after the voltage application.

The apparatus for evaluating a piezoelectric film enables easy, efficient, and highly accurate evaluation of a deformation and displacement of a piezoelectric film, without highly complex controlling techniques or complicated mechanisms.

The method for evaluating a piezoelectric film enables, by means of the apparatus of the present invention, to evaluate a deformation and displacement of a piezoelectric film easily, efficiently, and highly accurately, without highly complex controlling techniques or complicated mechanisms.

The examples of the present invention is explained hereinafter, but the present invention is not limited by the following examples in any way.

EXAMPLE 1

The apparatus for evaluating a piezoelectric film according to Example 1 was equipped with a detection unit which detects a displacement magnitude of probes, and an evaluation unit which evaluate a thickness of the piezoelectric film based on the displacement of the probes. Although it is not illustrated in FIG. 6, the evaluation unit was equipped with a display, i.e. a monitor and a printer, which displays the evaluated information. Each units were operated by a computer control (also referred to as a controlling unit, hereinafter).

Figure 6A:
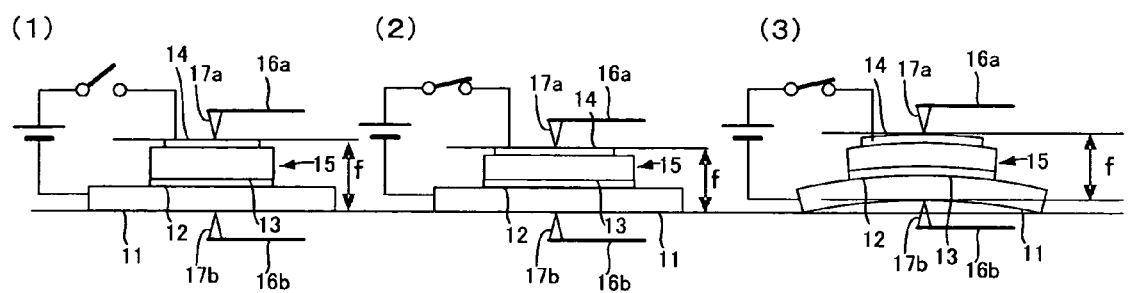
FIG. 6A is a schematic diagram showing an embodiment of a piezoelectric film-evaluation by means of the apparatus for evaluating a piezoelectric film according to Example 1 of the present invention, and wherein (1) shows the evaluation before applying the voltage, (2) shows the evaluation after applying the voltage, and (3) shows the condition of the sample which is warped after the application of the voltage.

As shown in FIG. 6A(1), the detection unit contained a pair of the probes 18a, 18b having probe tips 17a, 17b and cantilevers 16a, 16b, and further contained a measuring unit (not illustrated in the figure) which measured deflections of the cantilevers 16a, 16b, at the time when the probe tips 17a, 17b were placed onto a sample 15.

In order to evaluate, by means of the apparatus for evaluating a piezoelectric film, a displacement and deformation regarding the thickness of the piezoelectric film before and after applying the voltage, first of all, a sample 15 was prepared by forming a lower electrode 12, a piezoelectric film 13, and an upper electrode 14 on a substrate 11 in this order. Sequentially, as shown in FIG. 6A(1), the probe tip 17a of the one of the probes 18a was placed on a surface of the sample which was a side where the upper electrode 14 was formed, and the probe tip 17b of the other probe 18b was placed at the corresponding position to that of the probe tip 17a on a surface of the substrate 15. In this condition, deflections of the pair of the cantilevers 16a, 16b were measured, the measured amounts were converted to displacements of the pair of the probes 18a, 18b, and the displacements were recorded.

As shown in FIG. 6A(2), when a voltage was applied to the sample 15, the sample 15 was shank (or stretched) in the thickness direction, and the deflections of the pair of the cantilevers 16a, 16b were changed thereby. This change in the deflections was detected as the displacements of the pair of the probes 18a, 18b.

Moreover, the displacements of the pair of the probes 18a, 18b with respect to a change of the applied voltage were detected in the same manner as described above by changing the intensity of the voltage.

Figure 6B:
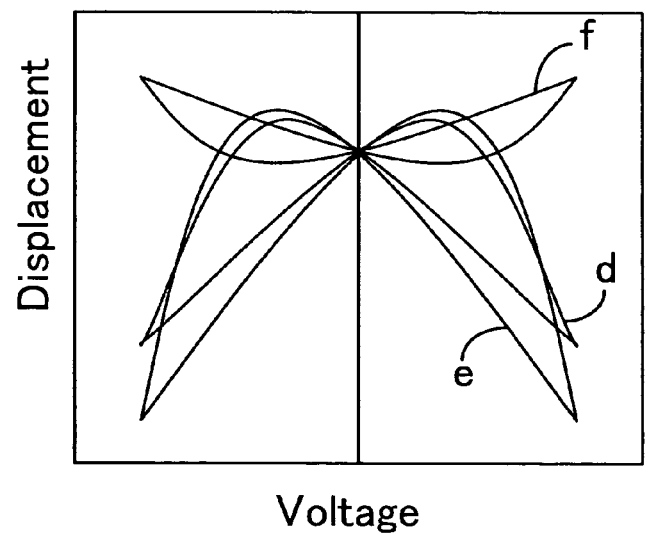
FIG. 6B is a graph showing the displacement of the pair of probes measured by the method for evaluating a piezoelectric film of the present invention by means of the apparatus of FIG. 6A, and the displacement of the piezoelectric film measured based upon the displacement of the pair of probes.

The detected displacement of one of the probes 18a before and after applying the voltage was plotted on a graph to thereby obtain a butterfly curve as shown with "d" in FIG. 6B. The displacement of the other probe 18b was also plotted to thereby obtain a butterfly curve as shown with "e" in FIG. 6B.

The displacement of the sample 15 itself could be determined from a difference between the displacement of one of the probes 18a, and the displacement of the other probe 18b. The displacement of the sample 15 was plotted to thereby obtain a curve as shown with f in FIG. 6B. Based upon this result, it was possible to evaluate the deformation, i.e, shrinkage (or stretch) of the piezoelectric film, the displacement of the surface area of the piezoelectric film due to the deformation.

Even when the sample 15 and the substrate 11 were warped as a result of the application of the voltage, as shown in FIG. 6A(3), the measurements were taken on the both surfaces of the sample 15 by the probes tips 17a, 17b of the probes 18a, 18b, and thus errors in the measurements could be deducted. Deferent from the related art wherein the measurements were taken on only one surface of the sample, the apparatus according to Example 1 could accurately detect a change of the thickness of the sample itself before and after the application of the voltage as shown with "f" in FIG. 6A(3).

EXAMPLE 2

The apparatus for evaluating a piezoelectric film according to Example 2 had the same structure to that of Example 1. The apparatus according to Example 2 further contained a transferring unit which moved the pair of the probes 18a, 18b in the X-Y-Z directions, and a position measuring unit which measured the positions of the probes 18a, 18b relative to the Z-direction. These units were also controlled by the controlling unit.

In Example 2, as shown in FIG. 7A, an initial setting of the X-direction and the Y-direction was performed by using a reference sample at the time of evaluating the piezoelectric film. As shown in FIG. 7A, the reference sample was a reference sample 25 which had a circular reference marker 20 having a diameter of 1 μm at the same position on the both surfaces. As shown in FIG. 7B, the reference sample was prepared by perpendicularly perforating a metal thin plate formed of nickel having a thickness of 20 μm to form a hole 21 having a diameter of 1 μm.

—Initial Setting—

The position of one of the probes 18a was set as Pf=(Xf, Yf), and the position of the other probe 18b was set as Pb=(Xb, Yb). The reference sample 25 was set on the apparatus for evaluating a piezoelectric film. The pair of the probes 18a, 18b were moved towards the reference marker 20, and the probe tips 17a, 17b were respectively placed on the center of the reference marker 20, namely in the hole 21, as shown in FIG. 7B. In this condition, the pair of the probes were controlled so as to maintain the deflections of the cantilevers 16a, 16b, amplitudes of the vibrated cantilevers, phases of the vibrated cantilevers, and frequencies of the vibrated cantilevers to be the predetermined values.

This positioning by the reference marker 20 was set as an initial position (starting position), i.e., Pf=(0, 0), Pb=(0, 0), of the pair of the probes 18a, 19b.

Also, the positions set by the reference marker 20 was determined as initial positions (starting positions) of the pair of the probes 18a, 19b for the Z-direction.

—Detection of Displacement—

Figure 8A:
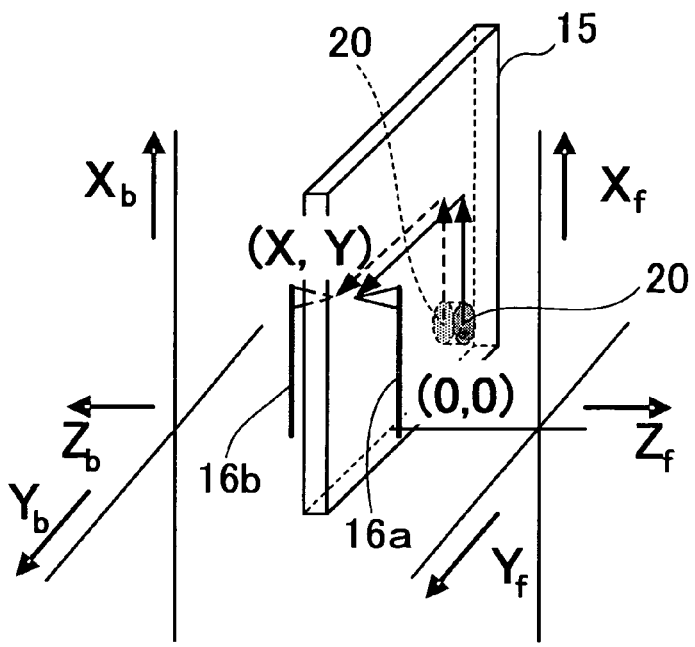
FIG. 8A is a schematic diagram showing the determination of the displacement of the sample based on the displacement magnitude of the probes in Example 2 of the present invention.
Figure 8B:
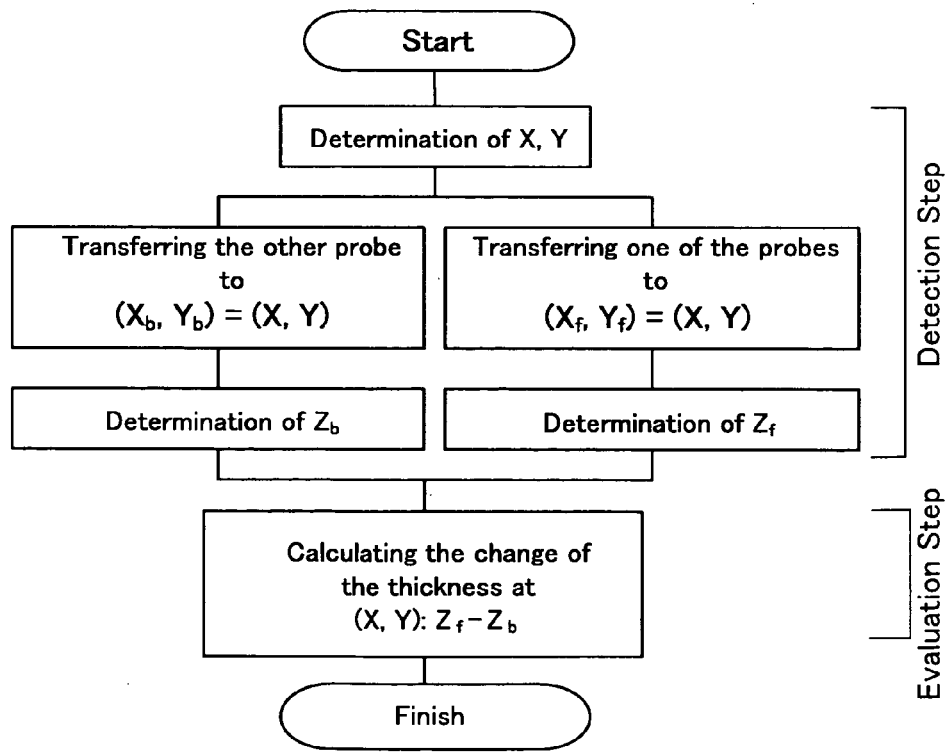
FIG. 8B is a flow chart showing the detection step and evaluation step in Example 2 of the present invention.

After completing the initial setting (positioning), the reference sample 25 was replaced with a sample 15 which was a subject for the actual measurements, as shown in FIG. 8A. The procedure of the evaluation of the sample 15 was explained with reference to a schematic diagram of FIG. 8A, and a flow chart of FIG. 8B. First of all, as shown in the flow chart, a control unit which controlled the transferring unit for the probes were set for the X-Y coordinates of the predetermined measuring point [(Xf, Yf)=(X, Y), (Xb, Yb)=(X, Y)]. As a result of this setting, the transferring unit moved the pair of the probes 18a, 18b to the position expressed as (X, Y) with reference to the starting point Pf=(0, 0), Pb=(0, 0) obtained by the initial setting (see the arrow shown in FIG. 8A). At the time of moving, the pair of the probes 18a, 18b were appropriately moved in the Z direction so as to maintain the deflections of the cantilevers 16a, 16b at a certain degree with respect to the sample 15, by a feedback control. As a result of the feedback control, the positions of the probes relative to the Z-direction is displaced along with the displacement of the both surfaces of the sample 15. The positions of the pair of the probes 18a, 18b relative to the Z-direction, i.e., Zf and Zb, were measured at the position (X, Y) by means of the detection unit.

At the time of measuring the position for the Z-direction, with reference to the starting points of the probes 18a, 18b for the Z-coordinate which were determined by the initial setting, the displacement of the pair of the probes 18a, 18b from each of the starting points to the direction of Zf shown in FIG. 8A was regarded as plus, and the displacement from the starting points to the direction of Zb shown in FIG. 8A was regarded as minus. In this manner, the displacements of the probes 18a, 18b were measured.

—Evaluation of Sample—

A change in the thickness of the sample was calculated based upon the aforeobtained positions of the pair of the probes relative to the Z-direction. Specifically, the thickness of the sample was calculated by the formula: Zf-Zb.

As described above, by moving the pair of the probes 18a, 18b at the same distance in the X-Y directions (Xf=Xb, Yf=Yb) with reference to the starting point of the X-Y coordinates (0, 0, 0), the positioning of the pair of the probes 18a, 18b was accurately carried out on the both surfaces of the sample 15, and the displacement of the pair of the probes could be always detected at the same position on the both surfaces of the sample 15.

Figure 8C:
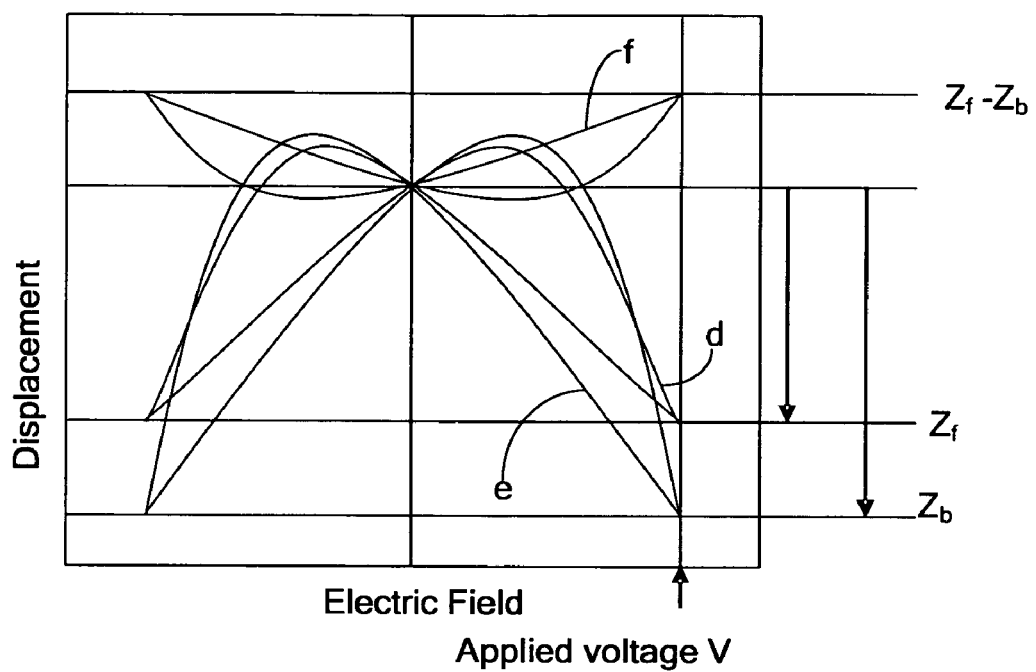
FIG. 8C is a graph showing the measurement results of the piezoelectric film, and the relationship of Zf and Zb in Example 2 of the present invention.

The results and relationship between Zf and Zb of Example 2 are shown in FIG. 8C. The graphs d, e, and f are as explained in Example 1.

In the case where the structural change such as thickness or shape, of the sample was performed before and after the application of the voltage, the positions of the pair of the probes relative to the Z-direction (Zf and Zb) were detected before and after applying the voltage, and changes in the thickness of the sample were respectively calculated based upon the detected information. Based upon the change in the thickness or the displacement of the position on the both surfaces before and after the application of the voltage, the evaluation could be performed on a occurrence of the deformation of thickness or shape, or the displacement due to the stretch or shrinkage of the sample before and after the application of the voltage, and also on a occurrence of the warp.

In Example 2, the movement of the pair of the probes towards the direction of Zf direction was taken as plus, the movement of the pair of the probes towards the direction of Zb was taked as minus, and thus the displacement of the sample itself was calculated by the formula of: Zf-Zb. Althernatively, the movement of the one of the probes 18a towards the direction of Zf could be taken as plus (stretch), the movement of the one of the probes 18a towards the direction of Zb could be taken as minus (shrinkage), the movement of the other probe 18b towards Zb could be taken as plus (stretch), and the movement of the other probe 18b towards Zf could be taken as minus (shrinkage) in another calculating method. In this case, the displacement of the sample itself could be calculated by the formula of: Zf+Zb.

EXAMPLE 3

As mentioned above, Example 2 evaluated the deformation and displacement of the sample at only one predetermined position. Example 3 was performed by means of the same apparatus for evaluating a piezoelectric film to that of Example 2, and evaluates a sample two-dimensionally or three-dimensionally by scanning the pair of the probes along the sample in the X-Y directions.

The procedure of evaluating the sample according to Example 3 was explained hereinafter with reference to a control diagram shown in FIG. 9.

First of all, an initial setting of the X-Y positions of the pair of the probes was performed by using the reference sample in the same manner as that of Example 2.

The reference sample was replaced with a sample 15 which was a subject for a measurement. The probe tips 16a, 16b of the probes 18a, 18b were placed at the stating position (X, Y)=(0, 0) of the initial setting on the sample 15. At this position, the positions of the probes 18a, 18b relative to the Z-direction were respectively set as starting points of Zf(0, 0, 0), and Zb (0, 0, 0).

Figure 9:
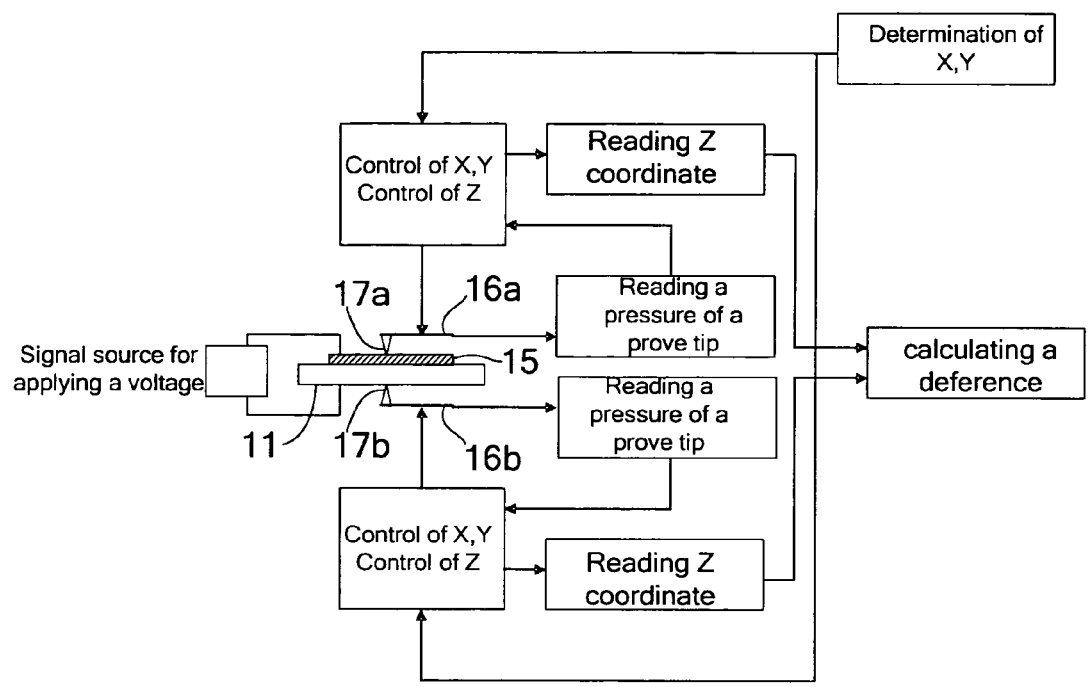
FIG. 9 is a control diagram showing the evaluation procedure of the sample in Example 3 of the present invention.

As shown in FIG. 9, the (X, Y) coordinates of the predetermined measuring point was set, the pair of the probes 18a, 18b were moved to the (X, Y) position, the voltage was applied at the (X, Y) position, and the displacement was detected. For example, Zf and Zb at the time of applying the voltage v were set as Zf (X, Y, v), and Zb (X, Y, z).

In the case of three-dimensionally evaluating the sample, the pair of the probes 18a, 18b were scanned in both the X-Y directions, Zf and Zb relative to the applied voltage v were detected each (X, Y) positions, and the detected data was recorded.

The displacement of the sample 15 was evaluated based upon all the detected data. For example, the changes in the thickness of the piezoelectric film at each (X, Y) positions were calculated as: [Zf (X, Y, v)−Zf(X, Y, 0)+Zb(X, Y, 0), (X, Y, v)].

In accordance with this method, not only the evaluation of the piezoelectric film itself, a occurrence of the warp of the sample on the whole including the substrate could be detected, and a micro electromechanical system (MEMS) equipped with a piezoelectric film could also be evaluated.

In Example 3, after measuring the displacement of Zf and Zb at the predetermined (X, Y) position by changing the intensity of the applied voltage (voltage scanning), the pair of the probes 18a, 18b were moved in the X-Y directions (position scanning), the voltage scanning was carried out at the sequential (X, Y) position, and the displacements of Zf and Zb were measured. This process was repeated, and the displacement of the sample 15 on the whole was evaluated with respect to the voltage application. Alternatively, the pair of the probes 18a, 18b were moved in the X-Y directions to measure the displacement at all the X, Y positions at a certain intensity of the voltage, the pair of the probes 18a, 18b were moved back to the original measuring (X, Y) position, the intensity of the voltage was changed to measure the displacement, and the pair of the probes 18a, 18b were moved in the X-Y directions to measure the displacement at all the X, Y positions at the changed intensity of the voltage. This process was repeated to evaluate the displacement of the whole sample 15.

Either the X or Y coordinate could be fixed, and the pair of the probes 18a, 18b could be scanned in either the X or Y direction. In accordance with this method, the two-dimensional structure (cross-section) of the sample 15 parallel to the Y axis (or X axis) at the predetermined X coordinate (or the Y coordinate) could be evaluated. Also, as the pair of the probes 18a, 18b were capable of arbitrarily moving in the X or Y direction, not only the aforementioned tow-dimensional structure of the sample parallel to the X or Y axis, but also two-dimensional structures of the sample along the diagonal lines thereof, or in any other arbitral positions.

The apparatus for evaluating a piezoelectric film according to Example 4 had the same structure to that of Example 2. The apparatus of Example 4 further contained a transferring unit (also referred to as a driving unit for a sample) which moved the sample in the X-Y positions. BY moving the sample, the pair of the probes could scan along the sample, and evaluated the sample two-dimensionally or three-dimensionally.

Figure 10:
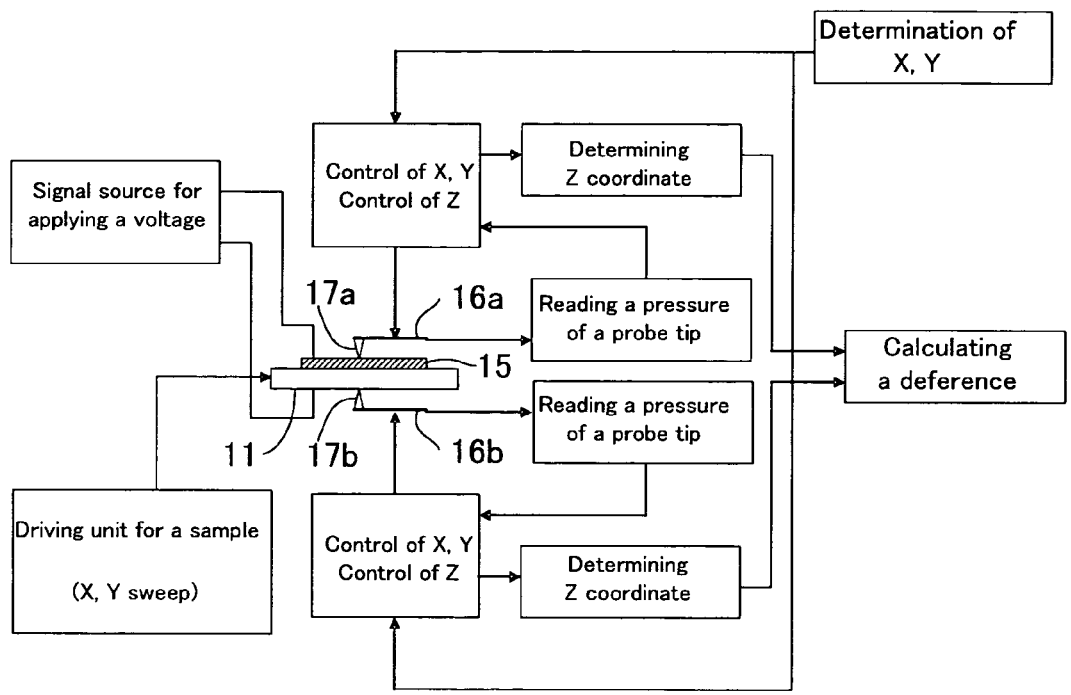
FIG. 10 is a control diagram showing the evaluation procedure of the sample in Example 4 of the present invention.

The procedure of evaluating the sample according to Example 4 was explained hereinafter with reference to a control diagram shown in FIG. 10.

First of all, an initial setting of the X-Y-Z positions of the pair of the probes was performed by using the reference sample in the same manner as that of Example 2.

The pair of the probes 18a, 18b were sequentially moved in the X-Y directions to place on the starting position for measurements. Thereafter, the pair of the probes 18a, 18b were fixed so as not to move in the X-Y directions, but were movable in the Z-direction along with the displacement of the both surfaces of the sample 15.

The pair of the probes 18a, 18b were scanned relatively along the sample 15, Zf and Zb of the pair of the probes 18a, 18b were read, and detected as the displacement in the same manner as in Example Example 3, provided that the sample 15 was moved in the X-direction (the Y-direction) by the driving unit.

The evaluation could be performed two-dimensionally or three-dimensionally based upon the detected displacement in the same manner as in Example 3.

Based upon the results of Examples 1-4, it was found that:
(1) Deferent from the case where the detection of the displacement was performed on only one surface of a sample by mans of the conventional laser displacement meter (single laser beam) or AFM, the apparatus and method of Examples 1-4 could detect a thickness of the sample itself, and evaluate the deformation or displacement of the sample with high accuracy, without occurring the measurement error even when the sample (piezoelectric film) was warped.
(2) Since the evaluation was performed by utilizing the probes, it was possible to evaluate the deformation or displacement of the sample with higher surface resolution than the case where the conventional laser displacement meter (single beam and double beam) was used.
(3) Although the conventional laser displacement meter of the double-beam required complex controls or sophisticated technology for a positioning of laser beam or control of an incident angle, the present invention realized easy controls and efficient evaluations.
(4) Since the present invention had high surface resolution and enabled surface scanned, the deformation or displacement of the sample could be determined two-dimensionally, and three-dimensional structure of the sample could be also determined by measuring the two-dimensional distribution of the deformation or displacement. As a result, it became possible to obtain the information such as how the piezoelectricity of the piezoelectric film of micro-order was changed as the change of the shape thereof, which had not been table to obtain or evaluated by the conventional AFM using a single probe, or laser displacement meter.

The present invention solves the problems in the prior art, and provides an apparatus and method for evaluating a piezoelectric film, which evaluate a deformation and/or displacement of an dielectric film with a simple manner, efficiency, and high accuracy.

The apparatus for evaluating a piezoelectric film of the present invention is highly accurate, reliable, and cost-efficient, as the apparatus of the present invention is capable of evaluating a deformation and/or displacement of the piezoelectric film with a simple manner, efficiency, and high accuracy. The apparatus of the present invention is suitably applied in the method for evaluating a piezoelectric film of the present invention.

The method for evaluating a piezoelectric film of the present invention is capable of evaluating a deformation and/or displacement of the piezoelectric film with a simple manner, efficiency, and high accuracy by using the apparatus for evaluating a piezoelectric film of the present invention.

What is claimed is:

1. An apparatus for evaluating a piezoelectric film, comprising:
    a detection unit comprising a pair of probes, each probe comprising a cantilever and a probe tip; and
    a evaluation unit,
    wherein the detection unit is configured to respectively place the probe tips on both surfaces of a sample comprising a piezoelectric film so as to detect a displacement magnitude of the pair of probes, and the evaluation unit is configured to evaluate either or both a deformation and a displacement of the piezoelectric film based upon the detected displacement magnitude of the pair of probes.

2. The apparatus for evaluating a piezoelectric film according to claim 1, wherein the detection unit detects the displacement magnitude of the pair of probes based upon a change in one selected from: positions of the pair of probes in Z direction; deflections of the cantilevers; amplitudes of the vibrated cantilevers; phases of the vibrated cantilevers; and frequencies of the vibrated cantilevers.

3. The apparatus for evaluating a piezoelectric film according to claim 1, wherein the detection unit is configured to respectively scan the pair of probes relatively along the sample so as to detect the displacement magnitude.

4. The apparatus for evaluating a piezoelectric film according to claim 1, wherein the sample comprises a substrate, and the piezoelectric film formed on the substrate.

5. The apparatus for evaluating a piezoelectric film according to claim 1, wherein the detection unit is configured to perform initial setting so as to make X-Y coordinates of one of the probes meet with X-Y coordinates of the other probe.

6. The apparatus for evaluating a piezoelectric film according to claim 5, wherein the prove tips of the pair of probes are respectively placed on both surfaces of a reference sample for positioning so as to perform the initial setting.

7. The apparatus for evaluating a piezoelectric film according to claim 6, wherein the reference sample for positioning is a substrate having a reference marker for positioning.

8. The apparatus for evaluating a piezoelectric film according to claim 7, wherein the reference marker is a hole which goes through the substrate.

9. The apparatus for evaluating a piezoelectric film according to claim 7, wherein the reference marker is a conductive material filled in a hole which goes through the substrate.

10. The apparatus for evaluating a piezoelectric film according to claim 1, wherein the detection unit is configured to perform an initial setting so as to initial positions of Z coordinates of the pair of proves.

11. A method for evaluating a piezoelectric film by means of an apparatus for evaluating a piezoelectric film, comprising:
    respectively placing a pair of probe tips, which are respectively contained in a pair of probes, on both surfaces of a sample comprising a piezoelectric film to detect a displacement magnitude of the pair of probes; and evaluating either or both a deformation and displacement of the piezoelectric film based upon the detected displacement magnitude of the pair of probes, wherein the apparatus comprises:

a detection unit comprising the pair of probes, each probe comprising a cantilever and the probe tip; and a evaluation unit, wherein the detection unit is configured to respectively place the probe tips to both surfaces of a sample comprising a piezoelectric film so as to detect a displacement magnitude of the pair of probes, and the evaluation unit is configured to evaluate either or both of deformation and displacement magnitude of the piezoelectric film based upon the detected displacement magnitude of the pair of probes.

12. The method for evaluating a piezoelectric film according to claim 11, wherein the step of detecting is to detect the displacement magnitude of the pair of probes based upon a change in one selected from: positions of the pair of probes in Z direction; deflections of the cantilevers; amplitudes of the vibrated cantilevers, phases of the vibrated cantilevers, and frequencies of the vibrated cantilevers.

13. The method for evaluating a piezoelectric film according to claim 11, wherein the step of detecting further comprises scanning the pair of probes respectively along the sample so as to detect the displacement magnitude.

14. The method for evaluating a piezoelectric film according to claim 11, wherein the sample comprises a substrate, and the piezoelectric film formed on the substrate.

15. The method for evaluating a piezoelectric film according to claim 11, wherein the step of detecting further comprises performing an initial setting so as to make X-Y coordinates of one of the probes meet with X-Y coordinates of the other probe.

16. The method for evaluating a piezoelectric film according to claim 15, wherein the initial setting is to respectively place the pair of probes on both surfaces of a reference sample for positiong.

17. The method for evaluating a piezoelectric film according to claim 16, wherein the reference sample for positioning is a substrate having a reference marker for positioning.

18. The method for evaluating a piezoelectric film according to claim 17, wherein the reference marker is a hole which goes through the substrate.

19. The method for evaluating a piezoelectric film according to claim 17, wherein the reference marker is a conductive material filled in a hole which goes through the substrate.

20. The method for evaluating a piezoelectric film according to claim 11, wherein the step of detecting further comprises performing an initial setting so as to determine initial positions of Z coordinates of the pair of proves.

* * * * *